(12) United States Patent
Wu

(10) Patent No.: US 8,454,341 B2
(45) Date of Patent: Jun. 4, 2013

(54) MOLD FOR MOLDING OPTICAL FIBER CONNECTORS

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 437 days.

(21) Appl. No.: 12/857,573

(22) Filed: Aug. 17, 2010

(65) Prior Publication Data
US 2011/0262577 A1  Oct. 27, 2011

(30) Foreign Application Priority Data

Apr. 21, 2010  (TW) .............................. 99112498 A

(51) Int. Cl.
 *B29C 33/12*  (2006.01)
(52) U.S. Cl.
 USPC ........... 425/185; 425/577; 425/468; 264/1.25
(58) Field of Classification Search
 USPC ..................... 425/185, 577, 468; 264/1.25
 See application file for complete search history.

(56) References Cited

U.S. PATENT DOCUMENTS

| 4,711,752 A | * | 12/1987 | Deacon et al. | ........... 264/328.12 |
| 5,439,370 A | * | 8/1995 | Lalaouna et al. | ............. 425/546 |
| 6,663,377 B1 | * | 12/2003 | Dean et al. | .................... 425/190 |
| 6,719,927 B2 | * | 4/2004 | Sakurai et al. | ............... 264/1.25 |

* cited by examiner

*Primary Examiner* — James Sanders
(74) *Attorney, Agent, or Firm* — Altis Law Group, Inc.

(57) ABSTRACT

A mold for molding an optical fiber connector having a number of lens portions with a flat surface or a curved surface, is provided. The mold includes an upper molding portion, a lower molding portion, a first insert, a number of second inserts and a fixing portion. The first insert includes a number of curved molding portions and a flat molding portion. The upper molding portion, the lower molding portion, the first insert and the fixing portion cooperatively define a molding space. A distal end of each second insert is inserted into the molding space. The first insert is moveable relative to the second insert such that the curved molding portions or the flat molding portion is selectively exposed in the molding space and is opposite to the distal ends of the second inserts.

10 Claims, 5 Drawing Sheets

MOLD FOR MOLDING OPTICAL FIBER CONNECTORS

BACKGROUND

1. Technical Field

The present disclosure relates to molds, and particularly, to a mold for molding an optical fiber connector.

2. Description of Related Art

An optical fiber connector typically includes a number of fiber receiving holes each for fixing an end of an optical fiber and a positioning block for keeping the optical fiber connector at an accurate position. Optical signals pass through the surface of one optical fiber connector and go into another coupled optical fiber connector. The surface of the optical fiber connector, which optical signals pass through, is called the lens portion. The functional surface can be a curved surface or a flat surface according to different transmission requirements.

It is usual to employ two different molds for respectively molding optical fiber connectors with curved surface or flat surface. Therefore, the costs of the mold and the optical fiber connector are increased.

What is needed therefore, is a mold for molding optical fiber connector to overcome the above-mentioned problems.

BRIEF DESCRIPTION OF THE DRAWINGS

The components of the drawings are not necessarily drawn to scale, the emphasis instead being placed upon clearly illustrating the principles of the embodiments of the present mold. Moreover, in the drawings, like reference numerals designate corresponding parts throughout several views.

DETAILED DESCRIPTION

Figure 1:
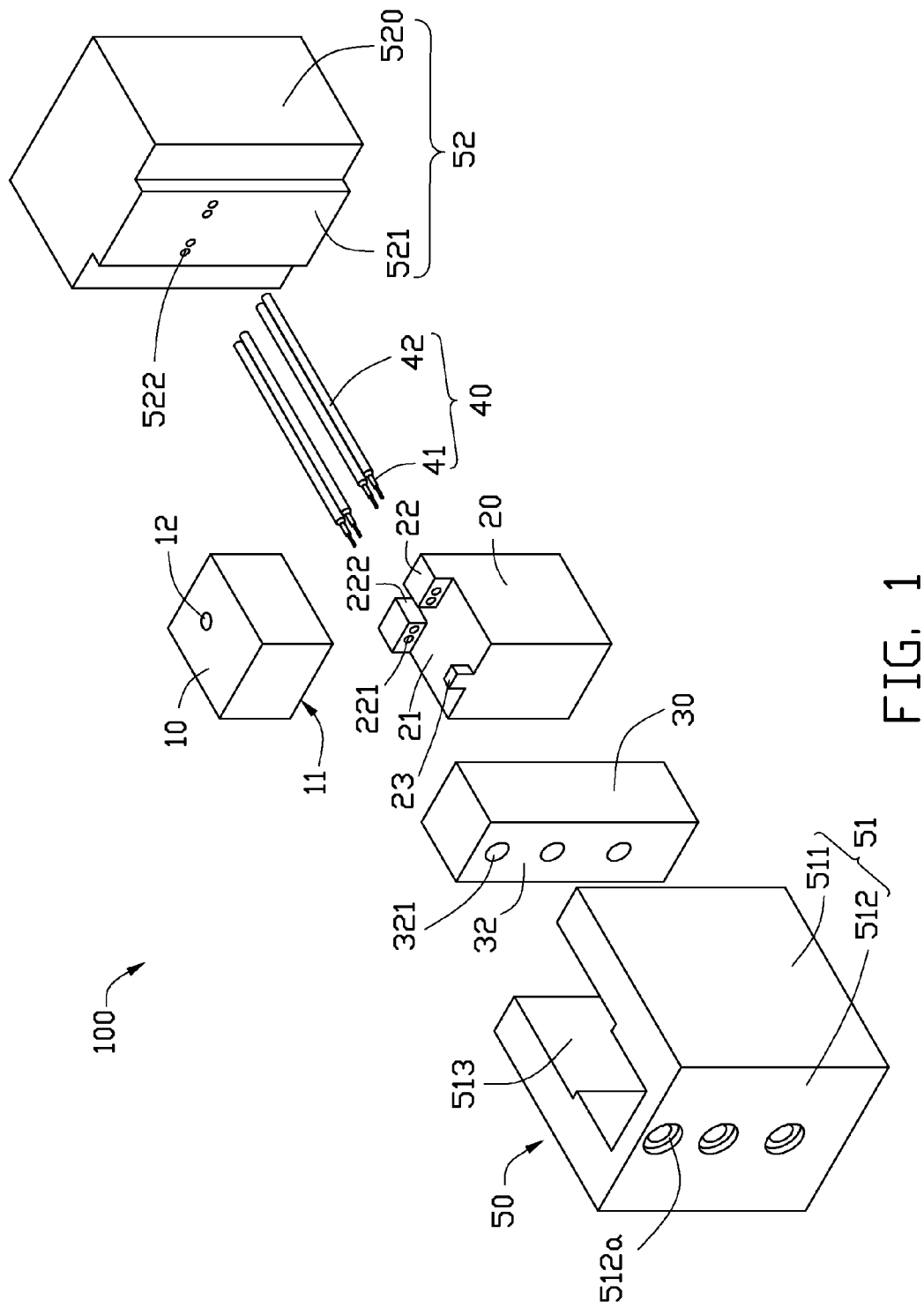
FIG. 1 is an exploded view of a mold for molding an optical fiber connector, according to an exemplary embodiment of the present disclosure.
Figure 2:
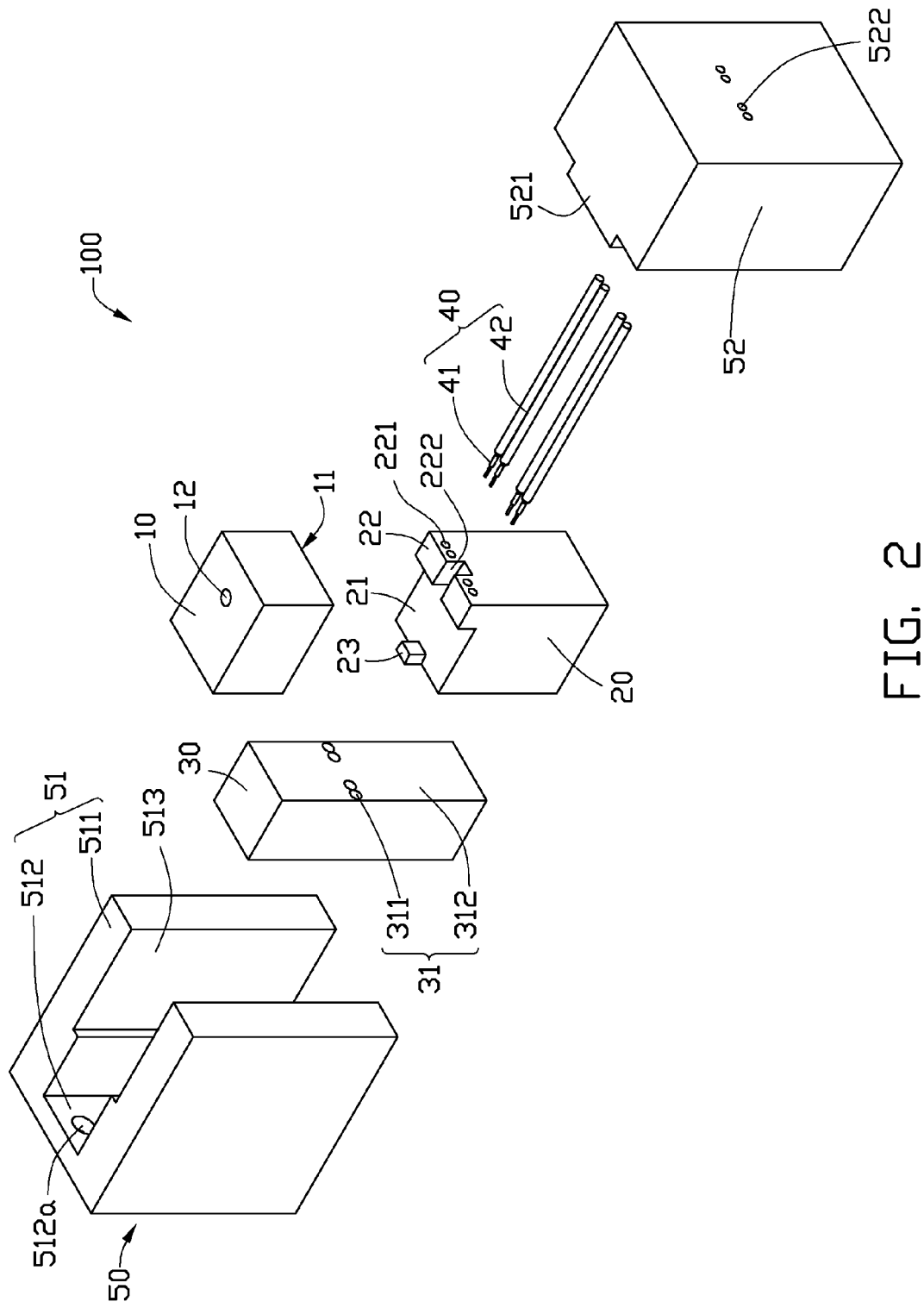
FIG. 2 is similar to FIG. 1, but shows the mold from another angle.

Referring to FIG. 1 and FIG. 2, a mold 100 for molding an optical fiber connector (not shown), according to an exemplary embodiment, is shown. The mold 100 includes an upper molding portion 10, a lower molding portion 20, a first insert 30, a number of second inserts 40 and a fixing portion 50.

The upper molding portion 10 includes a first molding surface 11 configured for forming a side surface of an optical fiber connector. The upper molding potion 10 defines a sprue 12 for introducing molten material into the mold 100. In this embodiment, the sprue 12 passes through the first molding surface 11.

The lower molding portion 20 includes a second molding surface 21, two first support members 22, and a second support member 23. The second molding surface 21 is configured for forming another side surface of the optical fiber connector. The first support members 22 and the second support member 23 are formed on the second molding surface 21, and the second support member 23 is opposite to the first support members 22. Each of the first support members 22 defines a number of positioning holes 221 corresponding to the second inserts 40. A space 222 is defined between the two first support members 22 for forming the positioning block of the optical fiber connector.

The first insert 30 is substantially a cuboid and is configured to form the functional surface of the optical fiber connector. The first insert 30 includes a molding surface 31 and an adjusting surface 32 opposite to the molding surface 31. The molding surface 31 includes a curved molding portion 311 and a flat molding portion 312. The curved molding portion 311 is configured for forming the curved surface of the optical fiber connector, in this embodiment, the curved molding portion 311 includes a number concave aspherical surfaces corresponding to the second inserts 40. The flat molding portion 312 is a flat surface processed by precision machining technology. The flat molding portion 312 is configured for forming the flat surface of the optical fiber connector. The first insert 30 defines a number of first adjusting holes 321 in the adjusting surface 32. In this embodiment, the number of the first adjusting holes 321 is three, the three first adjusting holes 321 are threaded blind holes.

Each second insert 40 is substantially a slender bar. Each second insert 40 includes a molding portion 41 and an extended portion 42 connected to the molding portion 41. The molding portion 41 is configured for forming a fiber receiving hole of the optical fiber. The extended portion 42 is extended from an end of the molding portion 41 for a distance and is configured for fixing the molding portion 41.

The fixing portion 50 is configured for fixing the upper molding portion 10, the lower molding portion 20, the first insert 30, and the second insert 40 together. The fixing portion 50 includes a first positioning member 51 and a second positioning member 52. The first positioning member 51 includes two side plates 511 and a connecting plate 512 interconnecting the two side plates 511. The side plates 511 are substantially parallel to each other. The side plates 511 and the connecting plate 512 cooperatively define a receiving space 513 therebetween. The connecting plate 512 defines a number of second adjusting holes 512a corresponding to the first adjusting holes 321. The second positioning member 52 includes a base 520 and a protruding portion 521 protruding from the base 520. The second positioning member 52 defines a number of through holes 522 corresponding to the positioning holes 221.

Figure 3:
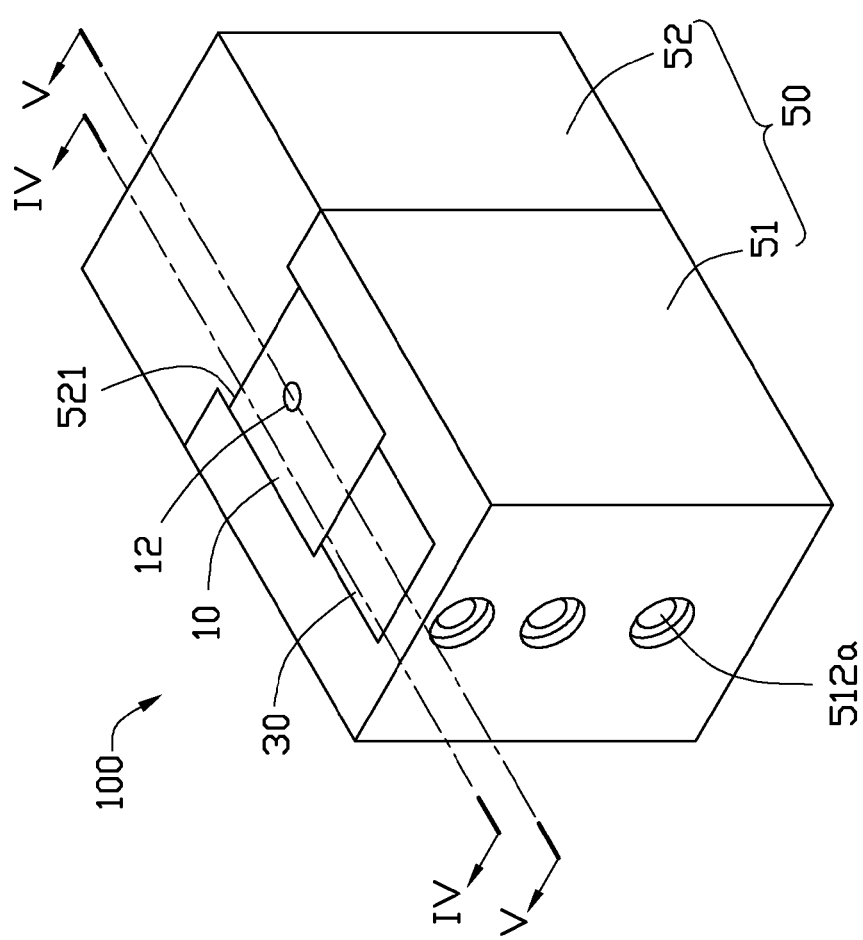
FIG. 3 is an assembled view of the mold of FIG. 1.
Figure 4:
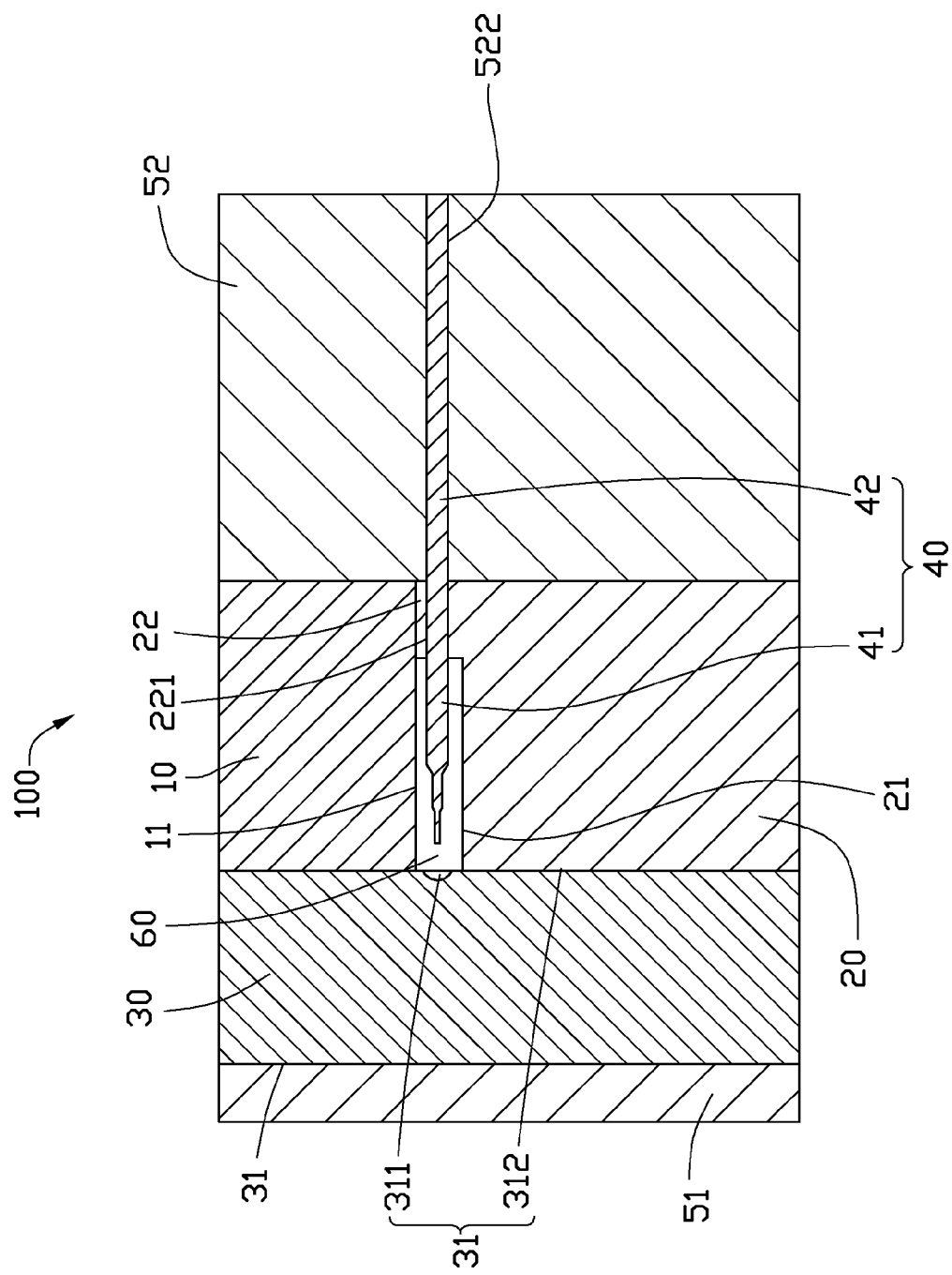
FIG. 4 is a sectional view of the mold taken along line IV-IV of FIG. 3.
Figure 5:
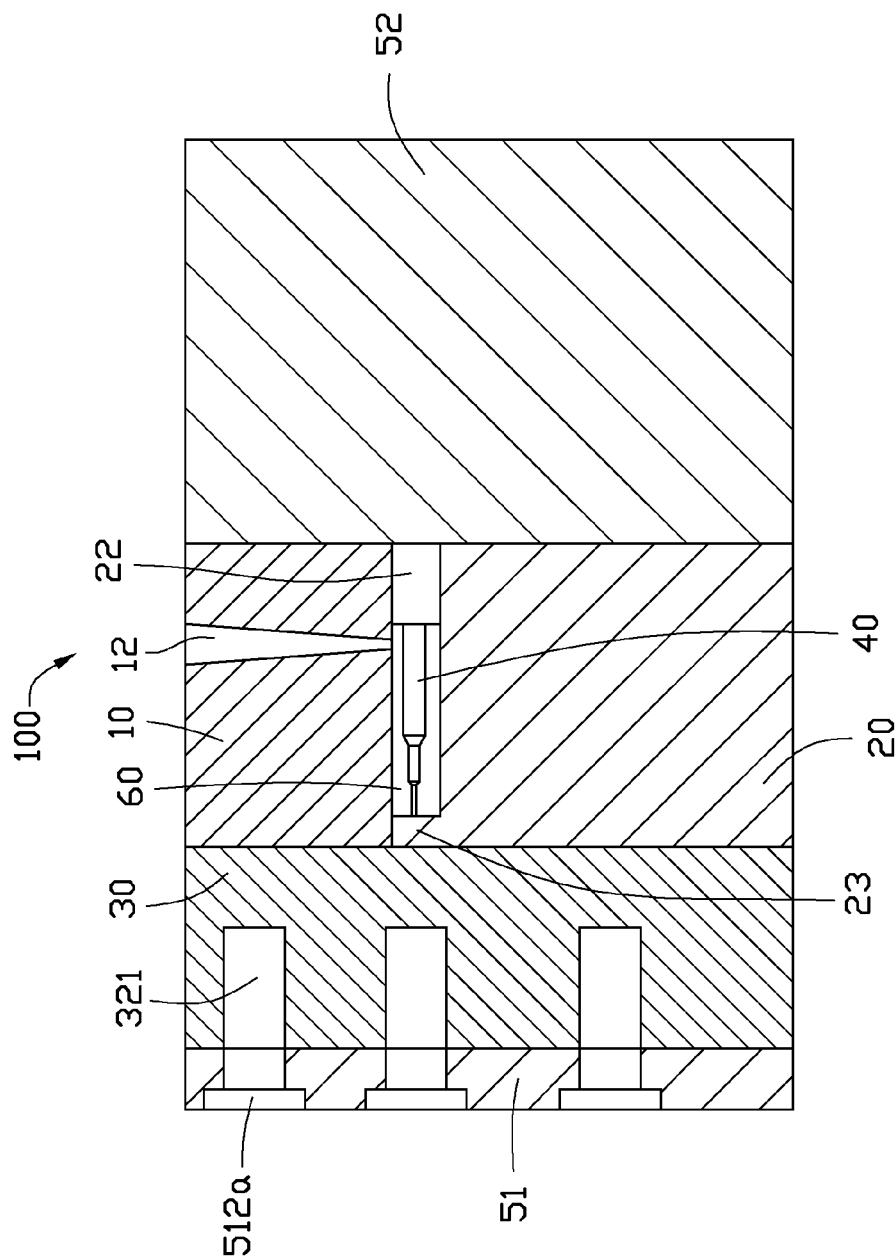
FIG. 5 is a sectional view of the mold taken along line V-V of FIG. 3.

Referring to FIGS. 3-5, in assembly, the upper molding portion 10 and the lower molding portion 20 are received in the receiving space 513, the first molding surface 11 of the upper molding portion 10 is opposite to the second molding surface 21 of the lower molding portion 20 and is supported by the first support members 22 and the second support member 23. The first insert 30 is inserted into the receiving space 513 between the upper and lower molding portion 10 and 20 and the connecting plate 512, the molding surface 31 is opposite to the upper and lower molding portion 10 and 20. The protruding portion 521 of the second positioning member 52 is engaged into the receiving space 513, the through holes 522 are correspondingly aligned to the fixing holes 221. The upper molding portion 10, the lower molding portion 20, the first insert 30 and the fixing portion 50 cooperatively define a molding space 60. Each second insert 40 passes through a corresponding through hole and a fixing hole 221, the molding portion 41 is inserted into the molding space 60.

In this embodiment, the three first adjusting holes 321 each aligned to the a corresponding second adjusting holes 512a, the curved molding portion 311 of the molding surface 31 is located in the molding space 60, thus the mold 100 can be used for molding an optical fiber connector with curved surface. Alternatively, the first insert 30 can be moved up to correspondingly align two lower first adjusting holes 321 to two upper second adjusting holes 512a, thus the flat molding portion 312 of the molding surface 31 is located in the molding space 60, the mold 100 can be used for molding an optical fiber connector with flat surface.

In use, the first insert 30 can be fixed on the fixing portion 50 with screws (not shown) passing though the first adjusting holes and the second adjusting holes, the molten material is injected into the molding space through the sprue 12.

By moving the first insert 30 relative to the fixing portion 50, the curved molding portion 311 or the flat molding portion 312 can be located in the molding space 60, thus the mold 100 can be used for molding optical fiber connected with curved surface or flat surface. Therefore, the cost of the mold 100 and the optical fiber connector molded by the mold can be decreased.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A mold for molding an optical fiber connector, the optical fiber connector having a plurality of lens portions and a plurality of fiber receiving holes aligned with the respective lens portions, each of the lens portions having a flat surface or a curved surface facing away from the respective fiber receiving hole, the mold comprising:
    an upper molding portion;
    a lower molding portion;
    a first insert comprising a plurality of curved molding portions for forming the curved surfaces of the lens portions, and a flat molding portion for forming the flat surfaces of the lens portions;
    a plurality of second inserts for forming the fiber receiving holes; and
    a fixing portion for retaining the upper molding portion, the lower molding portion, the first insert and the second inserts therein;
    wherein the upper molding portion, the lower molding portion, the first insert and the fixing portion cooperatively define a molding space, a distal end of each second insert is inserted into the molding space, the first insert is moveable relative to the second insert such that the curved molding portions or the flat molding portion is selectively exposed in the molding space and is opposite to the distal ends of the second inserts.

2. The optical fiber connector mold of claim 1, wherein the fixing portion comprises a first positioning member and a second positioning member, the first and second positioning members fixing the upper molding portion, the lower molding portion and the first insert therebetween.

3. The mold of claim 2, wherein the first positioning member comprises two side plates and a connecting plate interconnecting the side plates, the side plates and the connecting plate cooperatively define a receiving space therebetween, the upper molding portion, and the lower molding portion and the first insert are received in the receiving space.

4. The mold of claim 3, wherein the second positioning member comprises a base and a protruding portion protruding from the base, and the protruding portion is engaged into the receiving space.

5. The mold of claim 3, wherein the first insert comprises an adjusting surface facing away from the lower mold, and a plurality of first adjusting holes defined in the adjusting surface, the connecting plate defines a number of second adjusting holes corresponding to the first adjusting holes.

6. The mold of claim 3, wherein the upper molding portion comprises a first molding surface, and the lower molding portion comprises a second molding surface opposite to the first molding surface of the upper molding portion.

7. The mold of claim 6, wherein the lower molding portion comprises two first support members and a second support member formed on the second molding surface, the first molding surface of the upper molding portion is supported by the first support members and the second support member.

8. The mold of claim 7, wherein the first support member defines a plurality of positioning holes corresponding to the second inserts, the second positioning member defines a number of through holes corresponding to the positioning holes, and each second insert passes through the corresponding positioning hole and the through hole.

9. The mold of claim 5, wherein the adjusting surface faces away from the curved molding portions and the flat molding portion.

10. A mold for molding an optical fiber connector, the optical fiber connector having a plurality of lens portions and a plurality of fiber receiving holes aligned with the respective lens portions, each of the lens portions having a flat surface or a curved surface facing away from the respective fiber receiving hole, the mold comprising:
    a first insert comprising a molding face, the molding face including a plurality of curved molding portions for forming the curved surfaces of the lens portions, and a plurality of flat molding portions for forming the flat surfaces of the lens portions;
    a plurality of second inserts for forming the fiber receiving holes; and
    wherein the first insert is moveable relative to the second insert such that the curved molding portions or the flat molding portions are selectively moved to be opposite to distal ends of the second inserts.

* * * * *